US012145253B2

(12) United States Patent
Ouyang

(10) Patent No.: US 12,145,253 B2
(45) Date of Patent: Nov. 19, 2024

(54) STORABLE AND LABOR-SAVING SCREWDRIVER AND SCREWDRIVER HEADS THEREOF

(71) Applicant: Keyi Technology (Guangzhou) Co., Ltd., Guangzhou (CN)

(72) Inventor: Kai Ouyang, Guangzhou (CN)

(73) Assignee: Keyi Technology (Guangzhou) Co., Ltd., Guangzhou (CN)

( * ) Notice: Subject to any disclaimer, the term of this patent is extended or adjusted under 35 U.S.C. 154(b) by 0 days.

(21) Appl. No.: 18/607,157

(22) Filed: Mar. 15, 2024

(65) Prior Publication Data

US 2024/0326226 A1 Oct. 3, 2024

(30) Foreign Application Priority Data

Apr. 3, 2023 (CN) ......................... 202320701830.1

(51) Int. Cl.
*B25G 1/08* (2006.01)
*B25B 15/02* (2006.01)

(52) U.S. Cl.
CPC .............. *B25G 1/085* (2013.01); *B25B 15/02* (2013.01)

(58) Field of Classification Search
CPC ..... B25B 15/02; B25B 15/005; B25B 15/007; B25B 15/008; B25B 23/16; B25G 1/08; B25G 1/085
USPC ..................................................... 81/436–439
See application file for complete search history.

(56) References Cited

U.S. PATENT DOCUMENTS

| | | | | | |
|---|---|---|---|---|---|
| 3,683,984 | A * | 8/1972 | Hull | B25G 1/085 | 81/436 |
| 4,924,733 | A * | 5/1990 | McKenzie | B25B 15/02 | 81/439 |
| 5,460,063 | A * | 10/1995 | Hodgson | B25B 13/44 | 81/439 |
| 6,099,311 | A * | 8/2000 | Wagner | A61C 8/0089 | 433/163 |
| 6,327,942 | B1 * | 12/2001 | Mariol | B25G 1/085 | 81/177.4 |
| 7,073,418 | B2 * | 7/2006 | Kuo | B25G 1/08 | 81/177.2 |
| 7,565,852 | B2 * | 7/2009 | Yu | B25G 1/085 | 81/439 |

(Continued)

FOREIGN PATENT DOCUMENTS

| | | |
|---|---|---|
| CN | 215548265 U | 1/2022 |
| CN | 219325180 U | 7/2023 |
| CN | 220534072 U | 2/2024 |

*Primary Examiner* — David B. Thomas
(74) *Attorney, Agent, or Firm* — George D. Morgan

(57) ABSTRACT

A storable and labor-saving screwdriver and screwdriver heads thereof are provided, relating to the field of screwdriver technology, which includes a grip handle in a cylinder shape and a handle head labor-saving assembly, wherein a rear end of the grip handle is provided with the handle head labor-saving assembly, the handle head labor-saving assembly is retractable, a plurality of inner hexagonal storage chambers are uniformly distributed on the grip handle along a longitudinal direction. The screwdriver can be used to tighten and replace screws of different specifications and models. It has advantages in simple operation, compact structure, and smaller volume, which is easy to carry, and easier for a screwdriver to tighten screws and save labor.

9 Claims, 11 Drawing Sheets

(56) References Cited

U.S. PATENT DOCUMENTS

| | | | | |
|---|---|---|---|---|
| 7,757,589 | B2 * | 7/2010 | Kielland | B25B 15/001 81/177.4 |
| 8,561,507 | B2 * | 10/2013 | Huang | B25G 1/085 81/177.4 |
| 10,189,150 | B2 * | 1/2019 | Healey | A61B 17/888 |
| 10,525,583 | B2 * | 1/2020 | Gorman | B25B 23/16 |
| 11,148,277 | B2 * | 10/2021 | Hu | B25B 23/16 |
| 11,376,719 | B2 * | 7/2022 | Thomas | B25G 1/063 |
| 11,691,252 | B2 * | 7/2023 | Chen | B25G 1/085 81/59.1 |
| 11,794,317 | B2 * | 10/2023 | Rubino | B25B 15/02 |
| 2008/0190249 | A1 * | 8/2008 | Yu | B25G 1/085 81/177.4 |
| 2015/0096414 | A1 * | 4/2015 | Geibel | B25B 15/00 81/438 |
| 2015/0196996 | A1 * | 7/2015 | Nelson | B25G 1/085 81/438 |
| 2016/0052124 | A1 * | 2/2016 | Lai | B25G 1/085 81/438 |
| 2024/0066681 | A1 * | 2/2024 | Aquino | B25B 23/0035 |

* cited by examiner

STORABLE AND LABOR-SAVING SCREWDRIVER AND SCREWDRIVER HEADS THEREOF

CROSS-REFERENCE TO RELATED APPLICATIONS

The application claims priority to Chinese patent application No. 2023207018301, filed on Apr. 3, 2023, the entire contents of which are incorporated herein by reference.

TECHNICAL FIELD

This disclosure relates to the field of screwdriver technology, in particular to a storable and labor-saving screwdriver and screwdriver heads thereof.

BACKGROUND

A screwdriver is a commonly tool used for turning screws. One type is an integral structure that the screw handle is in fixed connection with the screwdriver head, and it can be used directly. The other type is to a detachable structure that the screw handle and the screwdriver head is separated, it only needs to simply replace the corresponding screwdriver head model when requiring to turn screws of different specifications and models. However, existing screwdrivers still have the following shortcomings:

1. In screwdrivers with separate handle and screwdriver head, a screwdriver head box is usually provided to store screwdriver heads of different specifications, which makes it inconvenient to carry and use;

2. A cavity for accommodating the screwdriver head is arranged at the head of the screw handle. When replacing the screwdriver head, it is necessary to unscrew the cover on the screw handle and pour the screwdriver head out of the screw handle. This operation is troublesome and it is not easy to find the corresponding screwdriver head model;

3. Due to their small size, the small screwdrivers are not very effective and may have difficulty tightening screws.

Therefore, it is necessary to further improve the structure of the screwdriver to make it more convenient for users to use and carry.

SUMMARY

The present disclosure provides a storable and labor-saving screwdriver and screwdriver heads thereof, aiming to solve the problems that the existing screwdriver with many accessories is inconvenient to carry, and small screwdrivers are difficult to tighten screws.

To achieve the above objectives, a storable and labor-saving screwdriver is provided in the present disclosure, which includes a grip handle in a cylinder shape and a handle head labor-saving assembly, wherein a rear end of the grip handle is provided with the handle head labor-saving assembly, the handle head labor-saving assembly is retractable, a plurality of inner hexagonal storage chambers are uniformly distributed on the grip handle along a longitudinal direction, an outer side of the grip handle is communicated to one side of each inner hexagonal storage chambers to form a strip opening for easy operation.

Preferably, the handle head labor-saving assembly includes a handle head, a handle cap, and a force lever; the grip handle is provided with a first through-hole at a center along a longitudinal direction, the end of the grip handle is tightly provided with the handle head, the handle head is provided with a second through-hole with a spherical necking slot at the end, the handle head is provided with a movable handle cap, one end of the force lever passes through the second through-hole and is fixedly connected to an inner surface of the handle cap, an other end of the force lever is capable to move inside the first through-hole and stops at the spherical necking slot of the second through-hole.

Preferably, a plurality of hexagonal protrusions are uniformly distributed on a front side of the handle head; Each hexagonal protrusion is used to tightly fit at an end of the corresponding inner hexagonal storage chamber to fix the handle head to the end of the grip handle; a strip slot is provided on a rear side of the handle head, and the strip slot is connected to the second through-hole in a through connection.

Preferably, the end of the force lever is provided with a ball head formed integrally, when the ball head moves to a spherical necking slot at the end of the second through-hole, the force lever is turned in horizontal and clamped into the strip slot to achieve labor-saving use of the screwdriver.

Preferably, a third magnetic block for adsorbing the ball head is fixedly provided in the first through-hole.

Preferably, the storable and labor-saving screwdriver further includes a damping rotation assembly, and a front end of the grip handle is rotatably connected with the damping rotation assembly.

Preferably, the damping rotation assembly includes a rotating ring, a rubber ring, and a first magnetic block, a front end face of the grip handle is integrally connected to a tube body, and one side of the tube body is provided with an annular groove; the annular groove is sleeved with the rubber ring, and the rotating ring is sleeved on the tube body, and an inner wall of the rotating ring is matched with the rubber ring in a damping fit, four arc-shaped protrusions are uniformly distributed on an outer surface of the rotating ring, and three magnetic suction placement slots are provided on the outer surface of the rotating ring; each magnetic suction placement slot is located between adjacent arc-shaped protrusions, and each magnetic suction placement slot is equipped with a first magnetic block; one side of the rotating ring is provided with an opening to allow the opening on the rotating ring to communicate with one of the inner hexagonal storage chambers during rotation.

Preferably, the front end of the tube body is provided with an inner hexagonal hole, and a second magnetic block is provided on the rear side of the inner hexagonal hole of the tube body.

Preferably, ring grooves arranged around a central axis of the handle are provided on both a front side and a rear side of the grip handle, the ring grooves are of an outer wide and inner narrow structure, so as to facilitate a removal of the screwdriver head from the inner hexagonal storage chamber.

In addition, to achieve the above objectives, a screwdriver head for a storable and labor-saving screwdriver is further provided by the present disclosure. The screwdriver head is capable to be flexibly placed in the inner hexagonal storage chamber of the storable and labor-saving screwdriver described above, so as to select and replace the corresponding screwdriver head according to different models of screws.

The advantageous effects of the present disclosure compared to existing technologies are shown as below:

The present disclosure provides a storable and labor-saving screwdriver and screwdriver heads thereof. By providing inner hexagonal storage chambers inside the grip handle for loading the screwdriver head, the screwdriver can be used to tighten screws of different specifications and models. The corresponding screwdriver head model can be found and replaced using the strip opening on the grip handle, without the need to pour out all the screwdriver heads. It has advantages in simple operation, compact structure, and smaller volume, which is easy to carry. Further, there is a force lever provided at the rear end of the grip handle. When in use, the force lever is pulled out and turned horizontally to clamp into a strip slot, forming a certain angle between the grip handle and the force lever. Through holding the handle cap and the grip handle horizontally for rotation, it is easier for a screwdriver to tighten screws and save labor.

To provide a clearer illustration of the structural features and functions of the present disclosure, the following will provide a detailed illustration of the present disclosure in conjunction with the accompanying drawings and specific embodiments.

REFERENCE MARKS IN THE DRAWINGS

1. grip handle; 2. damping rotation assembly; 3. handle head labor-saving assembly; 4. inner hexagonal storage chamber; 5. rotating ring; 6. rubber ring; 7. second magnetic block; 8. tube body; 9. annular groove; 10. arc-shaped protrusion; 11. inner hexagonal hole; 12. first magnetic block; 13. magnetic suction placement slot; 14. opening; 15. handle head; 16. handle cap; 17. force lever; 18. first through-hole; 19. hexagonal protrusion; 20. second through-hole; 21. spherical necking slot; 22. strip slot; 23. ball head; 24. third magnetic block; 25. ring groove; 26. screwdriver head.

Detailed Description of the Embodiments

Unless otherwise defined, all technical and scientific terms used in this article have the same meanings as those commonly understood by those skilled in the art of this application. The terms used in the specification of the application in this article are only for the purpose of describing specific embodiments and are not intended to limit the present application. The terms "including" and "having" in the description and claims of this application, as well as the accompanying drawings, and any variations thereof, are intended to cover non-exclusive inclusion. The terms "first", "second", etc. in the specification and claims of this application or the above drawings are used to distinguish different objects, rather than to describe a specific order.

Referring to "embodiment" in this article means that specific features, structures, or features described in conjunction with the embodiments may be included in at least one embodiment of the present application. The phrase appearing in various positions in the specification does not necessarily refer to the same embodiment, nor is it an independent or alternative embodiment that is mutually exclusive with other embodiments. The skilled person in the art explicitly and implicitly understand that the embodiments described in this article can be combined with other embodiments.

To achieve the above objectives, a storable and labor-saving screwdriver is provided by the present embodiment, as shown in FIG. 1 to FIG. 3 and FIG. 5-FIG. 6. The storable and labor-saving screwdriver includes a grip handle 1 in a cylinder shape and a handle head labor-saving assembly 3. The rear end of the grip handle 1 is provided with the handle head labor-saving assembly 3, and the handle head labor-saving assembly 3 is retractable. A plurality of inner hexagonal storage chambers 4 are uniformly distributed on the grip handle 1 along the longitudinal direction, and the outer side of the grip handle 1 is communicated to one side of each inner hexagonal storage chambers 4 to form a strip opening for easy operation.

Figure 1:
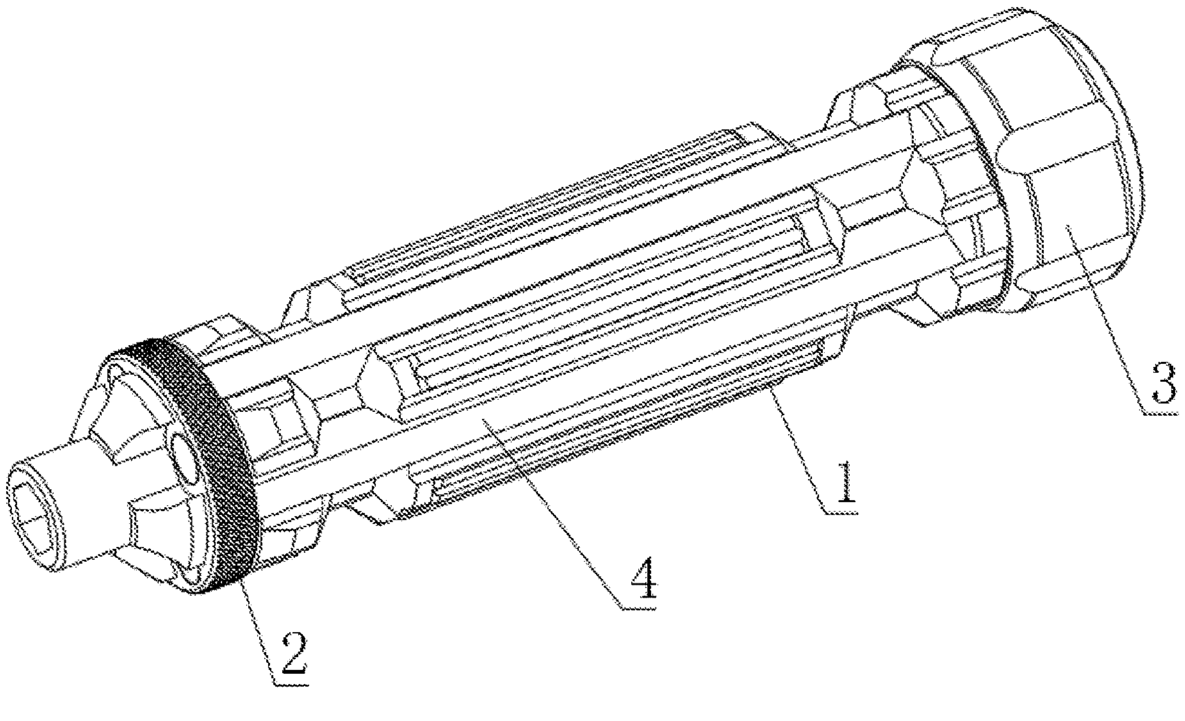
FIG. 1 is a schematic diagram of the three-dimensional structure of a storable and labor-saving screwdriver of the present disclosure.

It should be noted that the strip opening in this embodiment is coplanar between the grip handle 1 and the inner hexagonal storage chamber 4, represented by the position marked 4 in FIG. 1, which facilitates operation through the strip opening.

In the present embodiment, the inner hexagonal storage chamber 4 is used to accommodate the screwdriver heads 26, and the handle head labor-saving assembly 3 makes it easier for the screwdriver to tighten the screw. Specifically, the grip handle 1 of the screwdriver is equipped with a plurality of inner hexagonal storage chambers 4 for accommodating the screwdriver heads 26. When using the screwdriver to tighten the screw, first find the corresponding model of screwdriver head 26 through the strip opening on the handle 1, and there is not need to pour out all the screwdriver heads 26. At this time, simply slide out the screwdriver head 26 in the inner hexagonal storage chamber 4 by hand, so it is easy to replace and carry the screwdriver heads 26, Wherein, in some traditional small-sized screwdrivers, it is sometimes difficult for users to exert force while holding the screwdriver. When encountering relatively tight screws, it is even more difficult to tighten them. However, using the screwdriver in this embodiment, users can pull out the handle head labor-saving assembly 3 at the rear end of the grip handle 1 and fold it to form a certain angle between the grip handle 1 and the rotating handle head labor-saving assembly 3, such as a 90 degree angle. In this way, the handle head labor-saving assembly 3 is rotated to drive the screwdriver to rotate, making it easier for the screwdriver to tighten the screw.

Figure 5:
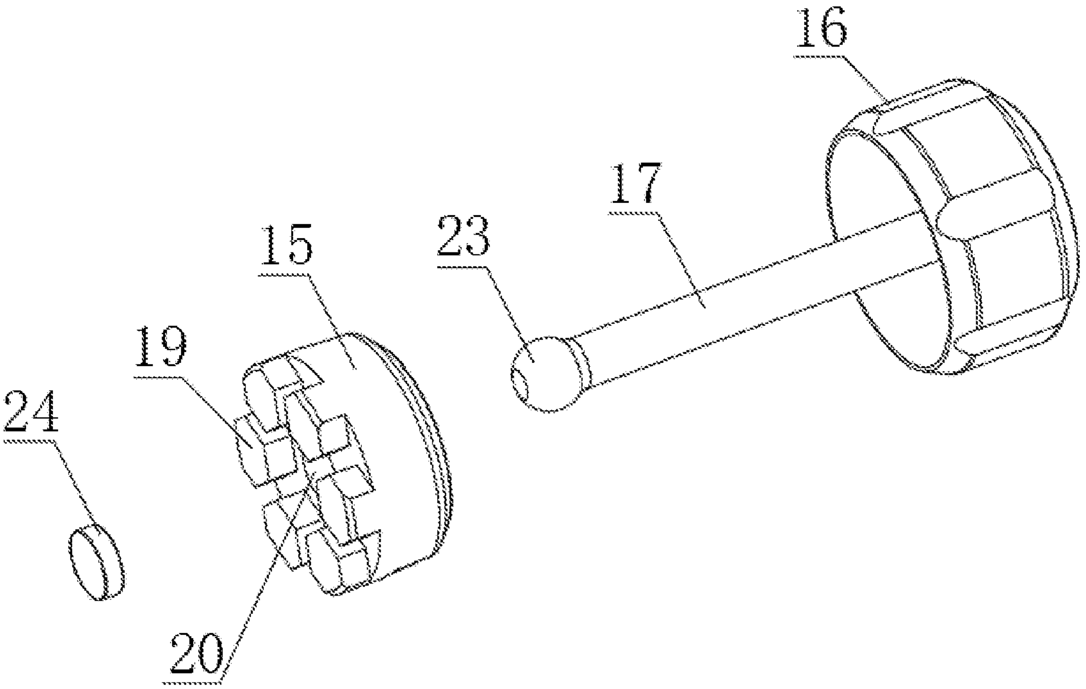
FIG. 5 is a schematic exploded view of the structure of the handle head labor-saving assembly in FIG. 3.
Figure 6:
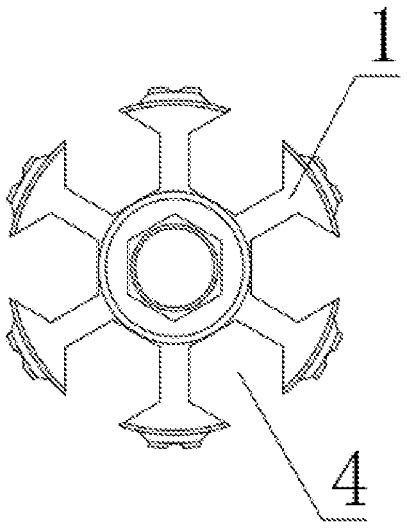
FIG. 6 is a schematic diagram of the side view structure of the grip handle of the storable and labor-saving screwdriver in the present disclosure.
Figure 7:
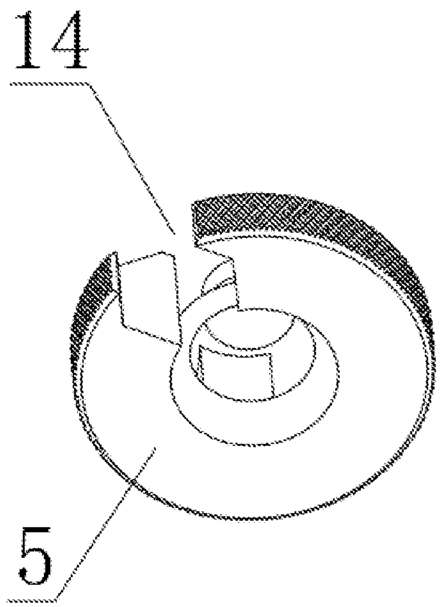
FIG. 7 is a schematic diagram of the three-dimensional structure of the rotating ring of the storable and labor-saving screwdriver in the present disclosure.
Figure 8:
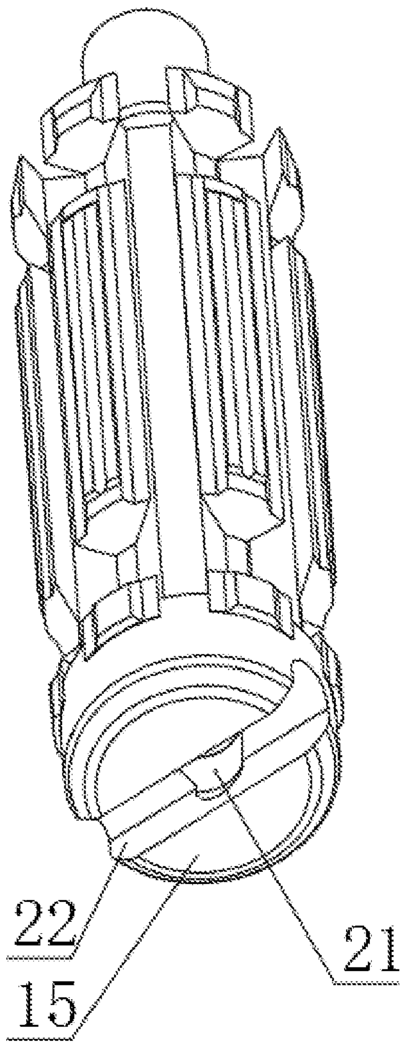
FIG. 8 is a schematic diagram of the three-dimensional structure of the handle head of the storable and labor-saving screwdriver in the present disclosure.

More specifically, as shown in FIG. 5 and FIG. 8, the handle head labor-saving assembly 3 includes a handle head 15, a handle cap 16, and a force lever 17. The grip handle 1 is provided with a first through-hole 18 at the center along the longitudinal direction, and the end of the grip handle 1 is tightly provided with the handle head 15. The handle head 15 is provided with a second through-hole 20 with a spherical necking slot 21 at the end. The handle head 15 is provided with a movable handle cap 16, one end of the force lever 17 passes through the second through-hole 20 to fixedly connect with the inner surface of the handle cap 16, and the other end of the force lever 17 is capable to move inside the first through-hole 18 and stops at the spherical necking slot 21 of the second through-hole 20. A plurality of hexagonal protrusions 19 are uniformly distributed on the front side of the handle head 15. Each hexagonal protrusion 19 is used to tightly fit at the end of the corresponding inner hexagonal storage chamber 4 to fix the handle head 15 to the end of the grip handle 1. A strip slot 22 is provided on the rear side of the handle head 15, and the strip slot 22 is connected to the second through-hole 20 in a through connection. The end of the force lever 17 is provided with a ball head 23 formed integrally, when the ball head 23 moves to a spherical necking slot 21 at the end of the second through-hole 20, and the force lever 17 is turned in horizontal and clamped into the strip slot 22 to achieve labor-saving use of the screwdriver.

Figure 10:
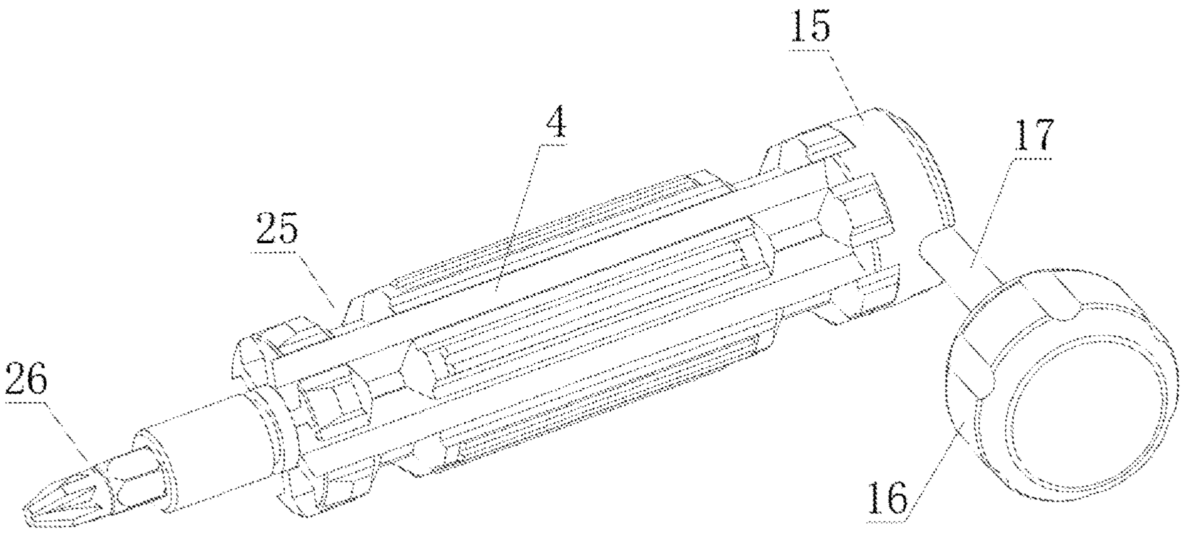
FIG. 10 is a schematic diagram of the second use state of the screwdriver head of the storable and labor-saving screwdriver in the present disclosure.
Figure 11:
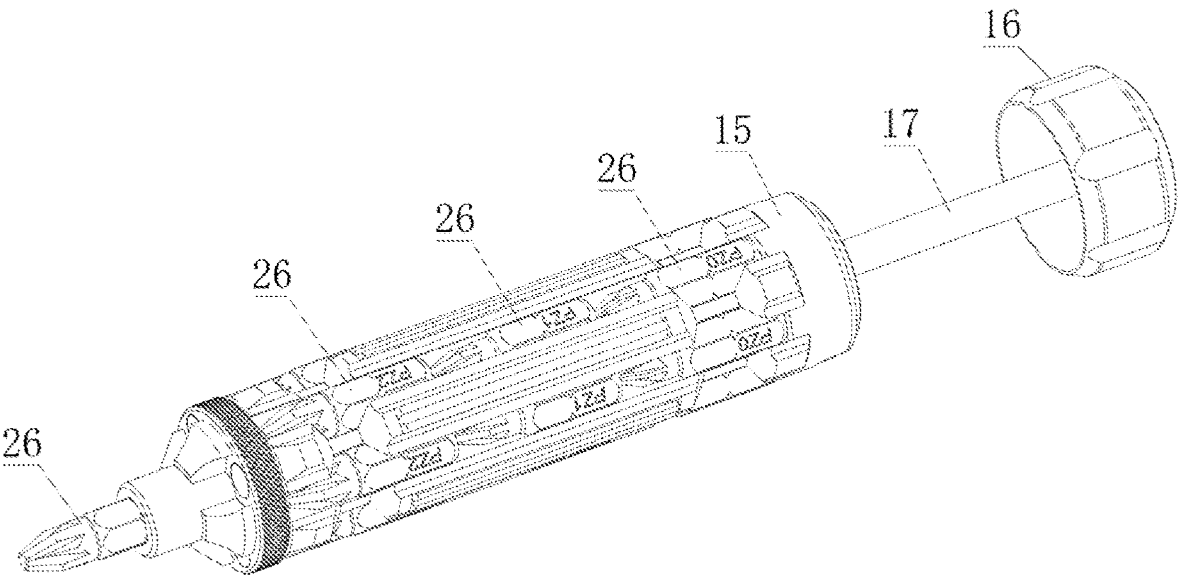
FIG. 11 is a schematic diagram of the stretching state of the screwdriver head of the storable and labor-saving screwdriver in the present disclosure.

In an embodiment, as shown in FIG. 10 and FIG. 11, when encountering a relatively tight screw, due to the small volume of the screwdriver as a whole, it is difficult for the user to exert force, and it will be more difficult for the user to grip the grip handle 1 to tighten the screw. At this time, the user can pull out the handle cap 16 at the rear end of the grip handle 1. The force lever 17 is rotated downward 90 degrees when the ball head 23 moves to the spherical necking slot 21 at the end of the second through-hole 20, one side of the force lever 17 is clamped into the strip slot 22 on the handle 15, and the handle cap 16, the grip handle 1, and the force lever 17 are held horizontally by hand. Then, the force lever 17 is rotated to drive the screwdriver to rotate, making it easier for the screwdriver to tighten the screw.

Figure 2:
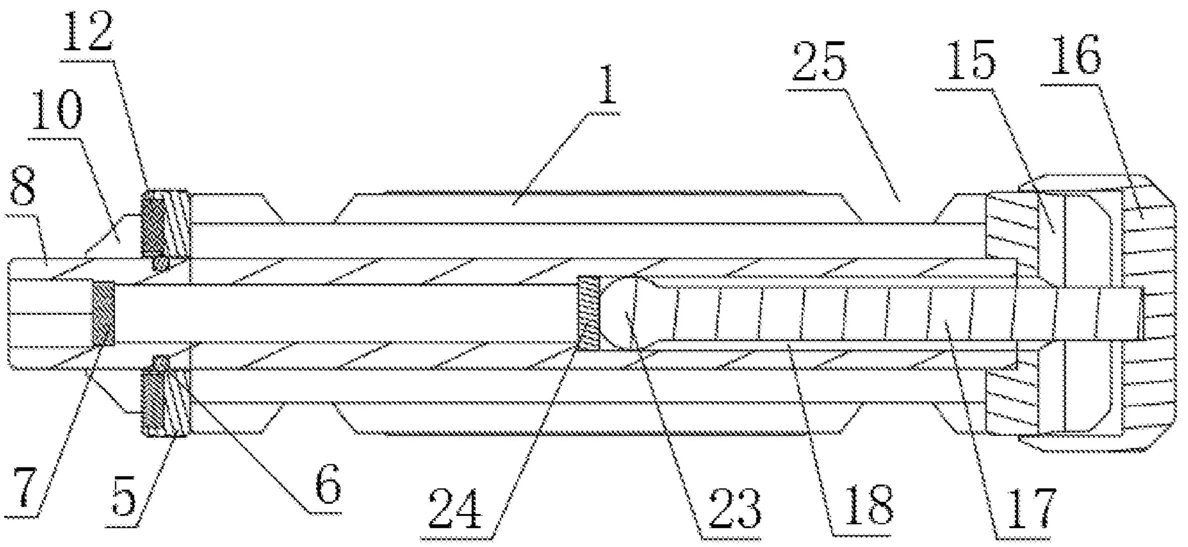
FIG. 2 is a schematic diagram of the cross-sectional structure of the storable and labor-saving screwdriver of the present disclosure.

Further, please refer to FIG. 2 and FIG. 5, a third magnetic block 24 for adsorbing the ball head 23 is fixedly provided in the first through-hole 18. For example, the third magnetic block 24 has an adsorption effect, when the force lever 17 contracts towards the first through-hole 18 until the magnetic block absorbs the ball head 23 on the force lever 17, the handle cap 16 automatically fits onto the handle head 15 without detaching from the handle head 15.

Further, please refer to FIG. 2-FIG. 4 and FIG. 7, the storable and labor-saving screwdriver further includes a damping rotation assembly 2, and the front end of the grip handle 1 is rotatably connected with the damping rotation assembly 2. Wherein the damping rotation assembly 2 can prevent the screwdriver heads 26 from falling out of the inner hexagonal storage chambers 4, and the screwdriver heads 26 can also be removed from the inner hexagonal storage chambers 4 through the damping rotation assembly 2.

Specifically, the damping rotation assembly 2 includes a rotating ring 5, a rubber ring 6, and a first magnetic block 12. The front end face of the grip handle 1 is integrally connected to a tube body 8, and one side of the tube body 8 is provided with an annular groove 9. The annular groove 9 is sleeved with the rubber ring 6, and the rotating ring 5 is sleeved on the tube body 8, and the inner wall of the rotating ring 5 is matched with the rubber ring 6 in a damping fit. Four arc-shaped protrusions 10 are uniformly distributed on the outer surface of the rotating ring 5, and three magnetic suction placement slots 13 are provided on the outer surface of the rotating ring 5. Each magnetic suction placement slot 13 is located between adjacent arc-shaped protrusions 10, and each magnetic suction placement slot 13 is equipped with a first magnetic block 12. One side of the rotating ring 5 is provided with an opening 14, so as to allow the opening 14 on the rotating ring 5 to communicate with one of the inner hexagonal storage chambers 4 during rotation.

In one embodiment, the screwdriver heads 26 placed in the inner hexagonal storage chamber 4 can be seen from the outside through the strip opening on the handle 1. The user can find the corresponding model of screwdriver head 26, then rotate the rotating ring 5, so as to rotate the opening 14 on the rotating ring 5 to the corresponding inner hexagonal storage chamber 4 where the screwdriver head 26 is placed. Then, the user takes out the screwdriver head 26 placed in the tube body 8 and places it 26 on one of the first magnetic blocks 12, and takes out the screwdriver head 26 from the inner hexagonal storage chamber 4 and places it in the tube body 8, then places the screwdriver head 26 placed on the first magnetic block 12 back into the inner hexagonal storage chamber 4, and then rotates the rotating ring 5 to make the opening 14 on the rotating ring 5 staggered with the inner hexagonal storage chamber 4. At this moment, the front end opening 14 of the inner hexagonal storage chamber 4 is closed, so that the screwdriver head 26 in the inner hexagonal storage chamber 4 will not fall out. By setting the rubber ring 6 to increase the rotational resistance of the rotating ring 5. When there is no external force to rotate the rotating ring 5, the rotating ring 5 will not rotate due to the swinging of the screwdriver, so that the opening 14 on the rotating ring 5 is staggered from the front end opening 14 of the inner hexagonal storage chamber 4, preventing the screwdriver head 26 placed in the inner hexagonal storage chamber 4 from falling out, so that the rotating ring 5 is tightly matched on the tube body 8 and will not fall off. It is also convenient to remove the entire rotating ring 5 from the tube body 8 and quickly install the screwdriver head 26 into the inner hexagonal storage chamber 4.

Figure 3:
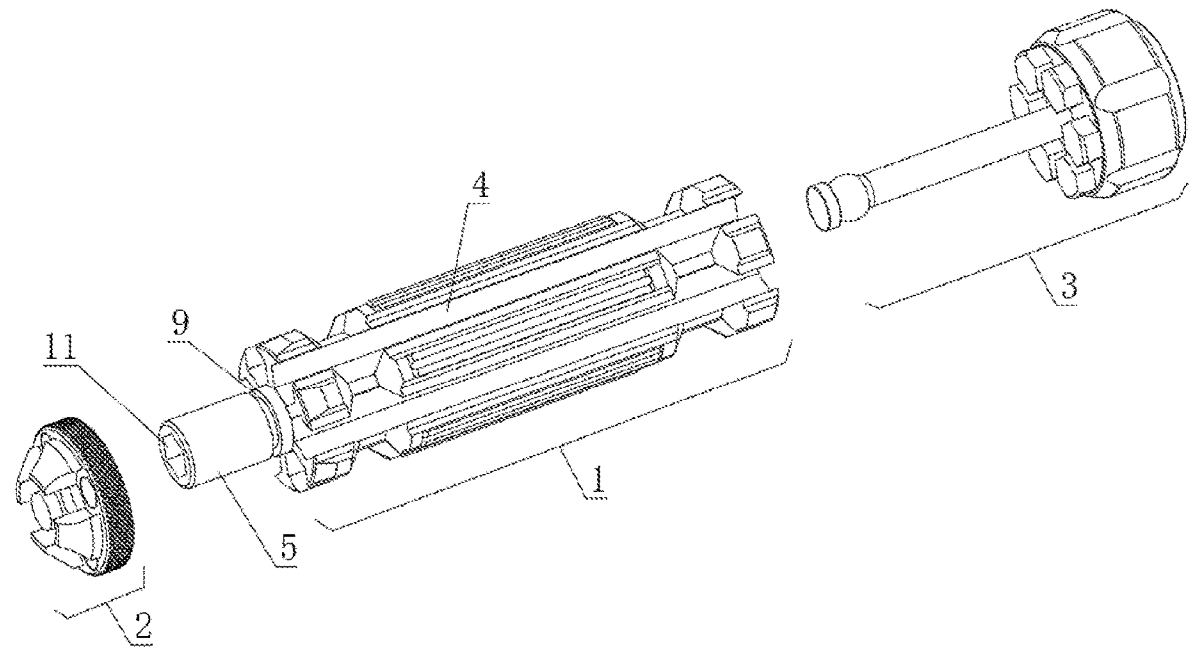
FIG. 3 is a schematic diagram of the storable and labor-saving screwdriver in disassembly state of the present disclosure.
Figure 4:
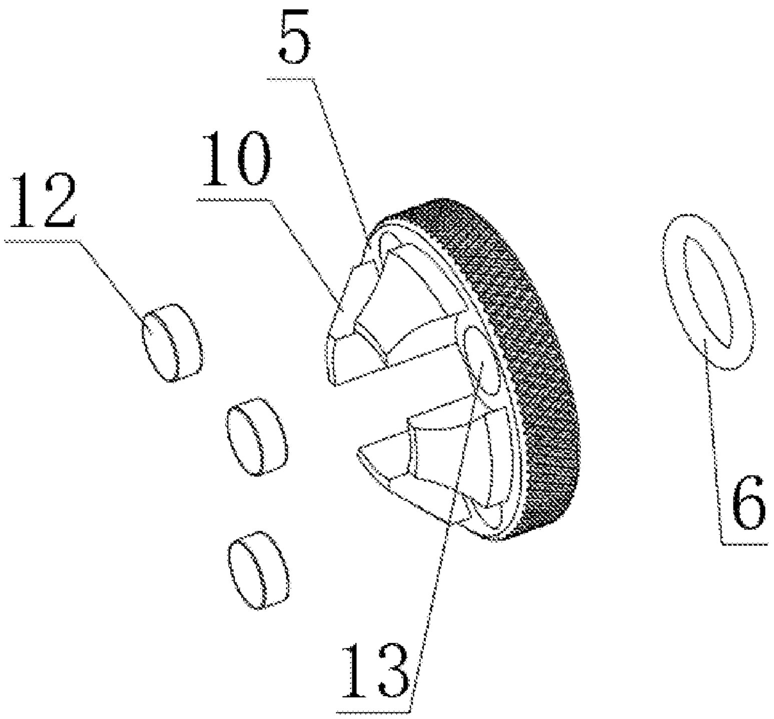
FIG. 4 is a schematic exploded view of the structure of a damping rotation assembly in FIG. 3.

Further, please refer to FIG. 2 and FIG. 3, the front end of the tube body 8 is provided with an inner hexagonal hole 11, and a second magnetic block 7 is provided on the rear side of the inner hexagonal hole 11 of the tube body 8. For example, placing the screwdriver head 26 inside the tube body 8, and the tube body 8 is equipped with the second magnetic block 7 that has adsorption function, so that the screwdriver head 26 will not fall even in a suspended state. The front end of the tube body 8 is equipped with the inner hexagonal hole 11 to cooperate with the screwdriver head 26, which has the function of driving the screwdriver head 26 to rotate.

Further, please refer to FIG. 2, ring grooves 25 arranged around the central axis of the grip handle 1 are provided on the front side and the rear side of the grip handle 1. The ring groove 25 is a groove with an outer wide and inner narrow structure, so as to facilitate the removal of the screwdriver head 26 from the inner hexagonal storage chamber 4. For example, when a user needs to replace the screwdriver head 26, the screwdriver head 26 is pushed out of the inner hexagonal storage chamber 4 through the ring groove 25 that is wider on the outside and narrower on the inside.

Figure 9:
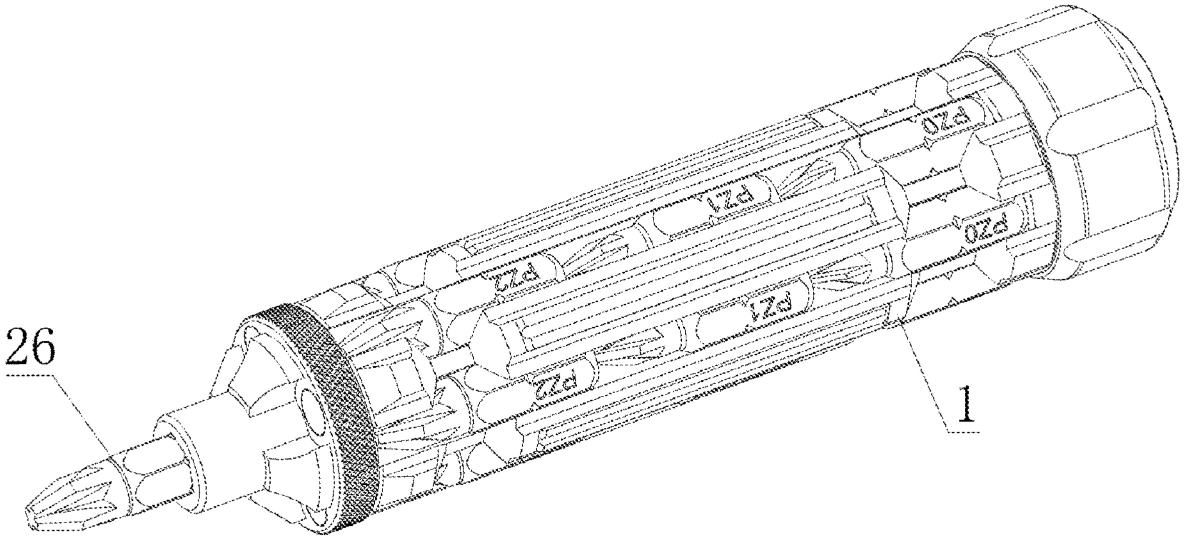
FIG. 9 is a schematic diagram of the first use state of the screwdriver head of the storable and labor-saving screwdriver in the present disclosure.

In addition, as shown in FIG. 9, a screwdriver head 26 is provided by the present disclosure, wherein the screwdriver head 26 is capable to be flexibly placed in the inner hexagonal storage chamber 4 of the storable and labor-saving screwdriver described above, so as to select and replace the corresponding screwdriver head 26*b* according to different models of screws. For example, the front end of the screwdriver heads 26 are the tools of screwdriver head 26 with different specifications, and the rear end of screwdriver heads 26 are an outer hexagonal structure. The specifications of screwdriver heads 26 may be: phillips screwdriver head 26, slotted screwdriver head 26, torx screwdriver head 26, and hexagon screwdriver head 26. The head models of phillips screwdriver head 26 also include PH000, PH00, PH0, PH1, P2, and PH3; the head models of slotted screwdriver head 26 also include 0.8 mm, 1 mm, and 1.2 mm 1.5 mm, 2 mm, and 3 mm; the head models of the torx screwdriver head 26 also include T3, T4, T5, T6, T8, and T10; and the head models of the hexagon screwdriver head 26 also include 0.7 mm, 0.9 mm, 1.3 mm, 105 mm, 2 mm, and 2.5 mm. Wherein, the size of the outer hexagon at the rear end of the screwdriver head 26 may be 6.0 mm, and the size of the inner hexagon storage chamber 4 may be 6.5 mm, in order to facilitate the movement of screwdriver head 26 in and out of the storage chamber. Each inner hexagon storage chamber 4 is equipped with different specifications and models of screwdriver head 26, allowing the screwdriver to tighten screws of different specifications and models.

As described above, the present disclosure provides a storable and labor-saving screwdriver and its screwdriver heads 26. By providing inner hexagonal storage chambers 4 inside the grip handle 1 for loading the screwdriver heads 26, the screwdriver can be used to tighten screws of different specifications and models. The corresponding model of the screwdriver heads 26 can be found and replaced using the strip opening on the grip handle 1, without the need to pour out all the screwdriver heads 26. It has advantages in simple operation, compact structure, and smaller volume, which is easy to carry. Further, there is a force lever 17 provided at the rear end of the grip handle 1. When in use, the force lever 17 is pulled out and turned horizontally to clamp into a strip slot 22, forming a certain angle between the grip handle 1 and the force lever 17. Through holding the handle cap 16 and the grip handle 1 horizontally for rotation, it is easier for a screwdriver to tighten screws and save labor.

The above, combined with specific embodiments, describes the technical principles of the present disclosure and is only the preferred embodiment of the present disclosure. The scope of the present disclosure is not limited to the above embodiments, and all technical solutions under the concept of this disclosure belong to the scope of the present disclosure. Other embodiments of the present disclosure obtained by the skilled person in the art without creative labour shall be included within the scope of the present disclosure.

What is claimed is:

1. A storable and labor-saving screwdriver, comprising a grip handle in a cylinder shape and a handle head labor-saving assembly, wherein a rear end of the grip handle is provided with the handle head labor-saving assembly, the handle head labor-saving assembly is retractable, a plurality of inner hexagonal storage chambers are uniformly distributed on the grip handle along a longitudinal direction, an outer side of the grip handle is communicated to one side of each inner hexagonal storage chambers to form a strip opening for easy operation;

the handle head labor-saving assembly comprises a handle head, a handle cap, and a force lever; the grip handle is provided with a first through-hole at a center along a longitudinal direction, the rear end of the grip handle is tightly provided with the handle head, the handle head is provided with a second through-hole with a spherical necking slot at the end, the handle head is provided with a movable handle cap, one end of the force lever passes through the second through-hole and is fixedly connected to an inner surface of the handle cap, an other end of the force lever is capable to move inside the first through-hole and stops at the spherical necking slot of the second through-hole.

2. The storable and labor-saving screwdriver according to claim 1, wherein a plurality of hexagonal protrusions are uniformly distributed on a front side of the handle head; Each hexagonal protrusion is used to tightly fit at an end of the corresponding inner hexagonal storage chamber to fix the handle head to the end of the grip handle; a strip slot is provided on a rear side of the handle head, and the strip slot is connected to the second through-hole in a through connection.

3. The storable and labor-saving screwdriver according to claim 2, wherein the end of the force lever is provided with a ball head formed integrally, when the ball head moves to a spherical necking slot at the end of the second through-hole, the force lever is turned in horizontal and clamped into the strip slot to achieve labor-saving use of the screwdriver.

4. The storable and labor-saving screwdriver according to claim 3, wherein a third magnetic block for adsorbing the ball head is fixedly provided in the first through-hole.

5. The storable and labor-saving screwdriver according to claim 1, further comprising a damping rotation assembly, and a front end of the grip handle is rotatably connected with the damping rotation assembly.

6. The storable and labor-saving screwdriver according to claim 5, wherein the damping rotation assembly comprises a rotating ring, a rubber ring, and a first magnetic block, a front end face of the grip handle is integrally connected to a tube body, and one side of the tube body is provided with an annular groove; the annular groove is sleeved with the rubber ring, and the rotating ring is sleeved on the tube body, and an inner wall of the rotating ring is matched with the rubber ring in a damping fit, four arc-shaped protrusions are uniformly distributed on an outer surface of the rotating ring, and three magnetic suction placement slots are provided on the outer surface of the rotating ring; each magnetic suction placement slot is located between adjacent arc-shaped protrusions, and each magnetic suction placement slot is equipped with a first magnetic block; one side of the rotating ring is provided with an opening to allow the opening on the rotating ring to communicate with one of the inner hexagonal storage chambers during rotation.

7. The storable and labor-saving screwdriver according to claim 6, wherein the front end of the tube body is provided with an inner hexagonal hole, and a second magnetic block is provided on the rear side of the inner hexagonal hole of the tube body.

8. The storable and labor-saving screwdriver according to claim 1, wherein ring grooves arranged around a central axis of the grip handle are provided on a front side and a rear side of the grip handle, the ring grooves are of an outer wide and inner narrow structure, so as to facilitate a removal of the screwdriver head from the inner hexagonal storage chamber.

9. A screwdriver head for a storable and labor-saving screwdriver, wherein the screwdriver head is capable to be flexibly placed in the inner hexagonal storage chamber of the storable and labor-saving screwdriver according to claim 1, so as to select and replace the corresponding screwdriver head according to different models of screws.

* * * * *